United States Patent [19]
Asai et al.

[11] Patent Number: 5,809,244
[45] Date of Patent: Sep. 15, 1998

[54] MULTI-MEDIA TITLE PLAYING APPARATUS

[75] Inventors: Kayoko Asai, Katsushika-ku; Atsushi Minemura, Kashiwa; Makoto Sato, Funabashi, all of Japan

[73] Assignee: Matsushita Electric Industrial Co., Ltd., Japan

[21] Appl. No.: 791,265

[22] Filed: Jan. 30, 1997

[30] Foreign Application Priority Data

Sep. 4, 1996 [JP] Japan .................................. 8-234017

[51] Int. Cl.$^6$ ...................................................... G06F 17/00
[52] U.S. Cl. ...................................... 395/200.47; 345/473
[58] Field of Search ............................. 345/200.47, 924, 345/473; 434/118, 335, 307 R, 323; 348/7, 13; 463/31, 43

[56] References Cited

U.S. PATENT DOCUMENTS 4,622,013  11/1986  Cerchio .................................. 434/118
5,239,617   8/1993  Gardner et al. ........................ 434/118
5,395,243   3/1995  Lubin et al. ........................... 434/118
5,597,312   1/1997  Bloom et al. .......................... 434/118
5,607,356   3/1997  Schwartz ................................. 463/31
5,692,212  11/1997  Roach ..................................... 345/473
5,724,499   3/1998  Nishiyama et al. ................ 395/200.47

FOREIGN PATENT DOCUMENTS 5-204576   8/1993  Japan .

Primary Examiner—Ellis B. Ramirez
Attorney, Agent, or Firm—Parkhurst & Wendel

[57] ABSTRACT

A multi-media title playing apparatus which dynamically changes play of a title according to an input by the user while the title is played has an external message receiving means for receiving a command from the outside of the apparatus and an external message interpreting means for processing the received command, in which an external application having a function to make a judgement on the basis of predetermined conditions on a user's input and send a command according to a result of the judgement to the multi-media title playing apparatus is described in a scenario.

4 Claims, 8 Drawing Sheets

CONTENTS OF A DESCRIPTION OF
OPERATION FILE A

```
[CIVICS] WHICH IS AN ASIAN
         COUNTRY ?
3
ARGENTINA : WRONG : 3
MALAYSIA  : CORRECT : 5
EGYPT     : WRONG : 3
```

OPERATION OF EXTERNAL APPLICATION
ACCORDING TO OPERATION FILE A

FIG. 8A

CONTENTS OF A DESCRIPTION OF
OPERATION FILE B

```
[LANGUAGE] HOW IS 「赤」 READ ?
4
WHITE : TRY ONCE MORE : 7
BLACK : TRY ONCE MORE : 7
RED   : CORRECT : 12
BLUE  : TRY ONCE MORE : 7
```

FIG. 8B

OPERATION OF EXTERNAL APPLICATION
ACCORDING TO OPERATION FILE B

[LANGUAGE] HOW IS 「赤」 READ ?
☐ WHITE
☐ BLACK
☐ RED
☐ BLUE
[        ] [EXECUTE]

[LANGUAGE] HOW IS 「赤」 READ ?
☐ WHITE
☐ BLACK
☑ RED
☐ BLUE
[ CORRECT ] [EXECUTE]

[LANGUAGE] HOW IS 「赤」 READ ?
☑ WHITE
☐ BLACK
☐ RED
☐ BLUE
[ TRY ONCE MORE ] [EXECUTE]

MULTI-MEDIA TITLE PLAYING APPARATUS

BACKGROUND OF THE INVENTION (1) Field of the Invention

The present invention relates to an apparatus which represents multi-media information such as a moving picture, a still picture, a text, a sound, etc. according to a predetermined scenario using an electronic computer.

(2) Related Art

A general multi-media title playing apparatus is fabricated on an assumption that the multi-media playing apparatus is directly controlled such that object data is displayed or deleted according to a scenario, or a title is controlled by receiving a title control command such as a pause command, a skip command, a rewind command or the like inputted through a command inputting means provided in the apparatus.

Japanese Patent Application Laid-Open Publication No. 5-204576 discloses a technique using an external application in the multi-media title playing apparatus, in which the user inputs or selects something so as to dynamically change play of a title thereafter according to the user's input or selection. More specifically, a time to activate an external application, or an external application activated when a button is clicked is described in a scenario, a result of execution of the external application is compared with conditions described in advance in the scenario to make a conditional judgement, then an operation described in advance is conducted as a process according to the result of the conditional judgement to change the operation of the title thereafter.

However, the above techniques have the following shortages.

First, the above multi-media title playing apparatus is fabricated on an assumption that the apparatus is directly operated by the user so that a control from the outside is impossible. For instance, if the multi-media title playing apparatus is provided to each student to give a lesson while playing a title which is a teaching material, it is impossible that the teacher simultaneously pauses or re-starts play of the teaching material that the students are watching, or changes the teaching material to another material.

Second, whenever kinds of the conditional sentences described in a scenario are expanded, it is necessary in the above multi-media title playing apparatus to expand a function of the multi-media title playing apparatus to interpret the expanded conditional sentences since the above apparatus has a poor expandability. In other words, the multi-media title playing apparatus according to the above techniques can make only a conditional judgement provided in advance as a function to the multi-media title playing apparatus.

Third, if it is desired to operate differently an external application used in one title, it is necessary to make another external application since an operation of the external application is fixed.

SUMMARY OF THE INVENTION

To solve the first problem, the present invention provides a multi-media title playing apparatus comprising a scenario and object data storage means for storing object data of a moving picture, a sound, a still picture, a text and an animated picture and a scenario in which a manner of representing the object data is described, a scenario retrieving-interpreting means for retrieving the scenario from the scenario and object data storage means and interpreting the scenario into scenario data, a scenario data storing means for storing the converted scenario data, a title control command inputting means for accepting a command used to operate a title composed of the scenario and the object data, an object presenting means for displaying and outputting an object which is a unit of the title when the title is displayed and outputted according to the scenario data stored in the scenario data storing means, an external message receiving means for receiving a message generated from the outside of the multi-media title playing apparatus, an external message interpreting means for interpreting the received message, and an overall control managing means for controlling the scenario and object data storage means, the scenario retrieving-interpreting means, the scenario data storing means, the title control command inputting means, the object presenting means, the external message receiving means and the external message interpreting means, the external message interpreting means converting the message received by the external message receiving means into an internal command interpretable by the overall control managing means, whereby the overall control managing means controls play of the title according to the converted internal command.

As above, the external message receiving means receives an external message, and the external message interpreting means converts the received external message into a title control command interpretable by the overall control managing means, whereby the overall control managing means executes the command. It is therefore possible to control play of the title from the outside.

To solve the second problem, according to this invention, the external application executing means executes an external application described in a scenario, a conditional judgement on an operation by the user such as a user's input or selection is made on the external application side, then the external application sends a title control command determined on the basis of a result of the conditional judgement to the multi-media title playing apparatus, the external command receiving means then receives the title control command.

By providing a function to make a conditional judgement to the external application, it is possible to make a necessary conditional judgement on a user's operation or the like on the external application side while the title is played so as to control the title according to a result of the conditional judgement without expanding a function of the multi-media title playing apparatus.

To solve the third problem, according to this invention, a name of an external application and a name of an operation file in which an operation and conditional sentences of the external application are described are described in a scenario, and the operation file is designated when the external application is executed, whereby the external application makes a conditional judgement according to contents described in the designated operation file.

If it is desired to differently operate an external application in a certain mode (in which the user selects one among plural answers, whereby a title to be played is varied according to the selected answer), it is possible to realize another operation using the same external application only by making a new operation file.

BRIEF DESCRIPTION OF THE INVENTION

Figures 7A, 7B:
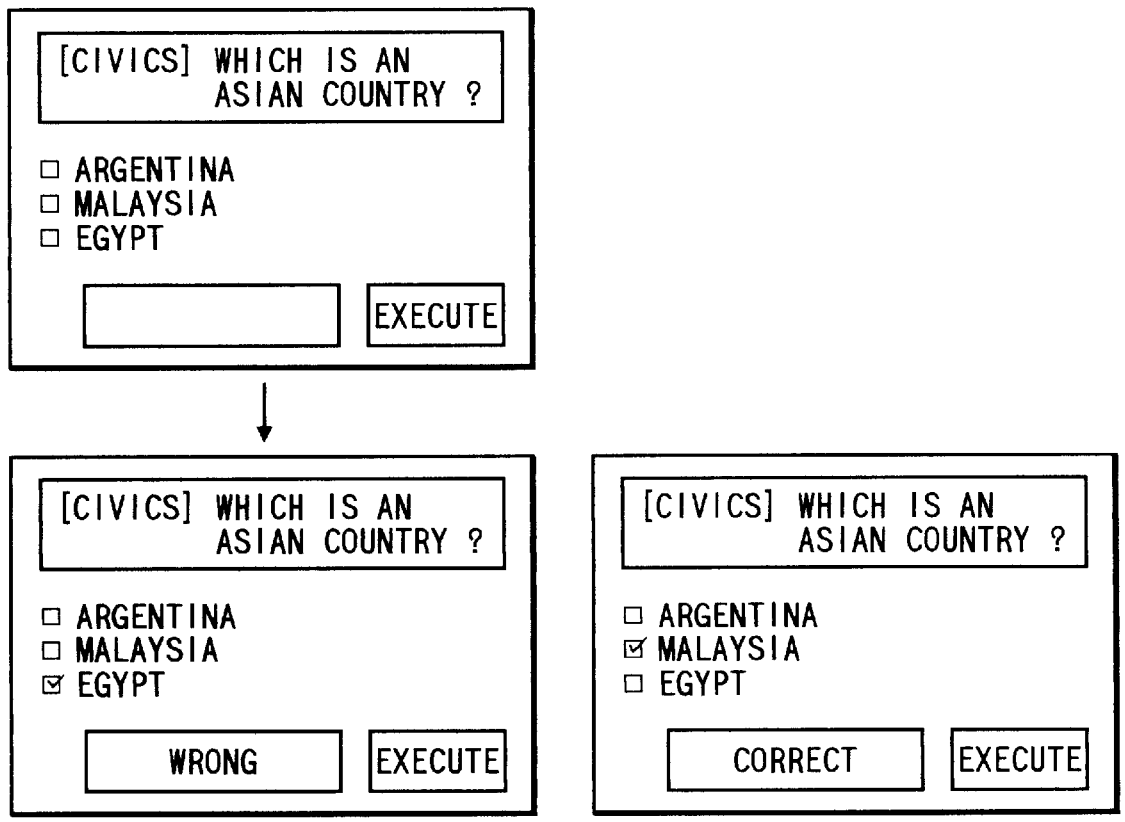

FIGS. 7A and 7B are diagram showing displays according to an operation file A, in which FIG. 7A illustrates an operation of the operation file A according to the third embodiment, whereas FIG. 7B illustrates an operation of an external application according to the operation file A; and FIGS. 8A and 8B are diagram showing displays according to an operation file B, in which FIG. 8A illustrates an operation of the operation file B according to the third embodiment, whereas FIG. 8B illustrates an operation of an external application according to the operation file B.

DETAILED DESCRIPTION OF THE INVENTION

Now, description will be made of embodiments of this invention referring to FIGS. 1 through 8, in which multi-media title playing apparatus according to the embodiments are realized on a computer operating on Windows.

(1) Description of a First Embodiment

Figure 1:
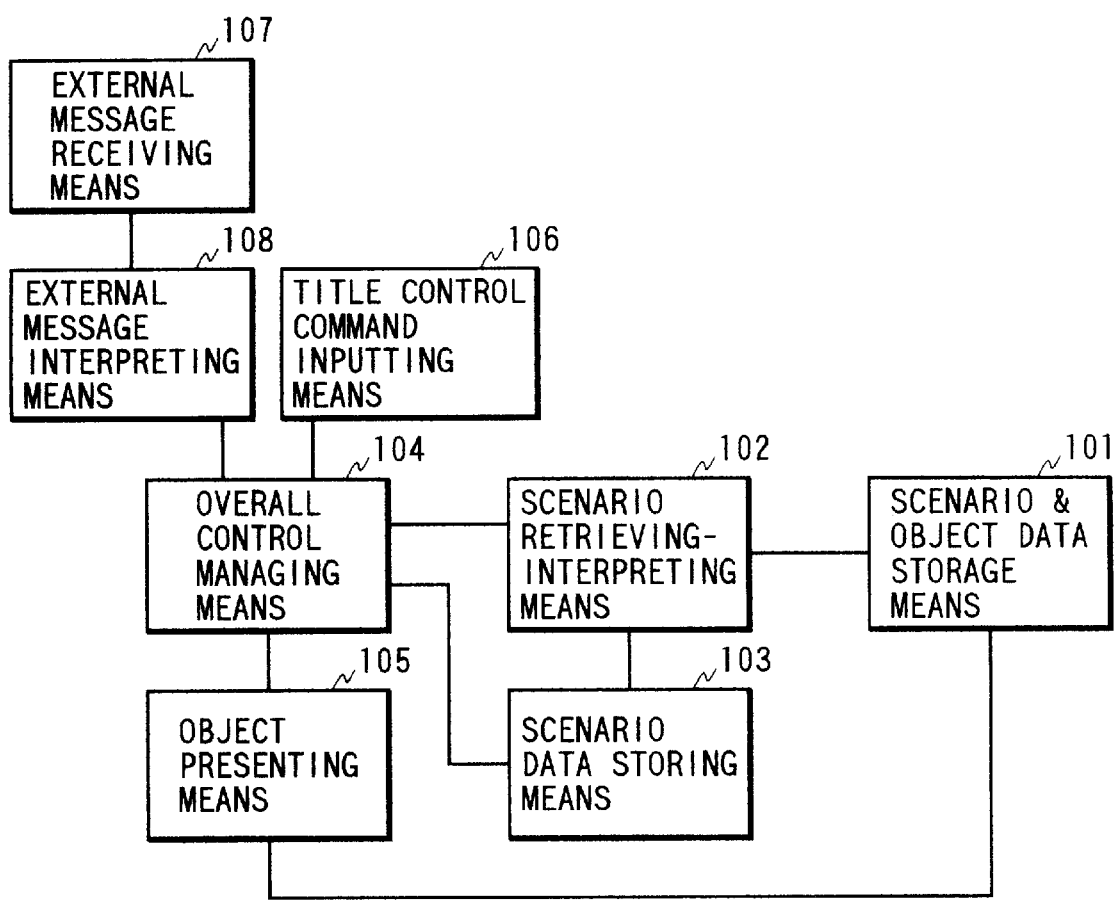
FIG. 1 is a block diagram showing a structure of a multi-media title playing apparatus according to a first embodiment of this invention.

FIG. 1 is a block diagram showing a multi-media title playing apparatus according to a first embodiment of this invention. In FIG. 1, reference numeral 101 denotes a scenario and object data storage means such as an auxiliary storage apparatus which stores a scenario managed by using a scenario ID which is an identifier and object data of a moving picture, a sound, a still picture, a text, an animated picture and the like as files. Reference numeral 102 denotes a scenario retrieving-interpreting means which retrieves a scenario from the scenario object data storing means 101 with a scenario ID designated by an overall control managing means 104 which will be described later, reads the scenario, generates scenario data and stores the generated scenario data in a scenario data storing means which will be also described later. Reference numeral 103 denotes the scenario data storing means such as a storage which stores scenario data. Reference numeral 104 denotes the overall control managing means which controls each means shown in FIG. 1 and a progress of the whole title. Reference numeral 105 denotes an object presenting means such as a display, a speaker, or the like which displays and outputs the object data of a moving picture, a sound, a still picture, a text, etc. as an object which is a unit of displaying and outputting handled in the title. Reference numeral 106 denotes a title control command inputting means such as a button on the display or the like which is used to input a command to control, e.g., play, pause, rewind, etc., an operation of the title. Reference numeral 107 denotes an external message receiving means which receives a message from the outside of the apparatus. Reference numeral 108 denotes an external message interpreting means which receives an external message character string from the external message receiving means 107, converts the received external message character string into an internal command recognizable by the overall control managing means 104 with reference to a message conversion table, and hands the internal command to the overall control managing means 104.

It is possible that the external message receiving means 107 receives an external message character string as a message from a client using Dynamic Data Exchange (DDE) function provided by Windows with the apparatus being as a server, and hands the character string to the external message interpreting means 108.

As an example of a format of a scenario used in this embodiment is as shown in Table 1 below.

TABLE 1

| [Action-Info] | | | | | | |
|---|---|---|---|---|---|---|
| Time1, | Object1, | Action1, | X1, | Y1, | Width1, | Height1 |
| Time2, | Object2, | Action2, | X2, | Y2, | Width2, | Height2 |
| . | . | . | . | . | . | . |
| . | . | . | . | . | . | . |
| . | . | . | . | . | . | . |
| TimeN, | ObjectN, | ActionN, | XN, | YN, | WidthN, | HeightN |
| [Object-Info] | | | | | | |
| Object1, | ObjKind1, | Filename1 | | | | |
| Object2, | ObjKind2, | Filename2 | | | | |
| . | . | . | | | | |
| . | . | . | | | | |
| . | . | . | | | | |
| ObjectN, | ObjKindN, | FilenameN | | | | |

In [Action-Info] in the above Table 1, one line represents one action. "Time" represents a time. Actions are described in the order of time "Time". "Object" represents an ID of an object to be displayed/deleted. "Action" represents an action to display (ON) or delete (OFF). "X" and "Y" are coordinates showing a position in which the object is displayed. "Width" and "Height" represent a size of the object to be displayed. "X" and "Y", "Width" and "Height" are described only when a kind of object data is MOVIE, IMAGE or TEXT, and "Action" is "display" (ON).

In [Object-Info], one line represents information about one object. "Object" represents an object ID which is an identifier of an object. "ObjKind" represents a kind of object data, which is a moving picture (MOVIE), a sound (SOUND), a still picture (IMAGE) or a text (TEXT). "Filename" represents a file name of object data.

Next, an operation of the overall control managing means 104 will be described in detail by way of an example.

First, the overall control managing means 104 designates a scenario ID and gives a scenario data generate command to the scenario retrieving-interpreting means 102. The scenario retrieving-interpreting means 102 issues an object display/delete command to the object presenting means 105 to a progress of an internal clock according to a scenario stored in the scenario data storing means 103. The overall control managing means 104 has an internal clock used to time a progress of a title to know a current time in the title (a title time). The overall control managing means 104 also has a timer used to generate an event in a predetermined interval. When the timer generates an event, the overall control managing means obtains a title time (Time_Now) at that time. The overall control managing means 104 then refers to [Action-Info] of the scenario data. If Time≦Time_Now and an unprocessed action exists, the overall control managing means 104 executes that action. If "Action" is "display" (ON), the overall control managing means 104 examines a kind of object data that is an object by referring to [Object-Info] of the scenario data.

Information about the object is represented at "Object", "ObjKind" and "Filename" in [Obejct-Info] as stated above so that the overall control managing means 104 refer to "ObjKind" in order to know a kind of the object data. If "ObjKind" is a moving picture (MOVIE), a still picture (IMAGE) or a text (TEXT), the overall control managing means 104 reads a file represented at "Filename" from the scenario and object data storage means 101 which is an auxiliary storage apparatus of the computer, and displays it in a designated position (XN, YN) and in a designated size (WidthN, HeightN) on a display which is the object presenting means 105. If "ObjKind" is a sound (SOUND), the overall control managing means 104 reads a file represented at "Filename" from the scenario and object data storage means 101 which is an auxiliary storage apparatus of the computer in the similar manner, and opens it to output a sound to a speaker which is the object presenting means 105. If "Action" is "delete" (OFF), the overall control managing means 104 deletes corresponding object data (or terminates an output to the speaker in the case of a sound).

On the other hand, the overall control managing means 104 receives a title control command to play, pause or rewind the title from the title control command inputting means 106, and processes it. In the case of a play command, the overall control managing means 104 starts not only a progress of the internal clock but also an operation of the timer. In the case of a pause command, the overall control managing means 104 stops a progress of the internal clock as well as the operation of the timer. In the case of a rewind command, the overall control managing means 104 returns the internal clock to "0" to reset the title time. The overall control managing means 104 realizes play, pause and rewind of the title through the above processes.

Further, the overall control managing means 104 receives a command from the external message interpreting means 107, and processes it. A command to be received by the overall control managing means 104 is a scenario change command other than the title control commands to play, pause and rewind the title. The scenario change command is to interrupt play of a title which is currently played and play another designated scenario. A process to be conducted by the overall control managing means 104 when the overall control managing means 104 receives the title control command is similar to the process conducted when the overall control managing means 104 receives a command from the above title control command inputting means 106. When receiving the scenario changing command, the overall control managing means 104 designates a scenario ID and gives a scenario data generate command to the scenario retrieving-interpreting means 102.

An example of a table used to convert an external message to an internal command according to this embodiment is shown in Table 2 below.

TABLE 2

| external message | internal command |
|---|---|
| Scenario_change [ScenarioID] | PAUSE |
| | CHANGE [ScenarioID] |
| | FROM_START |
| Title_Pause | PAUSE |
| Title_Play | PLAY |
| Title_From_Start | FROM_START |

In Table 2, if the external message is Scenario_change [ScenarioID], the external message interpreting means 108 sends a temporarily stop command (PAUSE), a scenario change command (CHANGE [ScenarioID]) and a rewind command (FROM_START) to the overall control managing means 104. This means that it is necessary to temporarily stop a title which is presently played before the scenario data is changed, as a process to change a scenario. Further, it is necessary to reset the internal clock of the overall control managing means 104 after the scenario has been changed. The conversion table shown in Table 2 is not a table showing a one-to-one correspondence of the external message to the internal command, but describes processes to be conducted in the apparatus and the order of the processes when a command received from the outside is executed.

Figure 2:
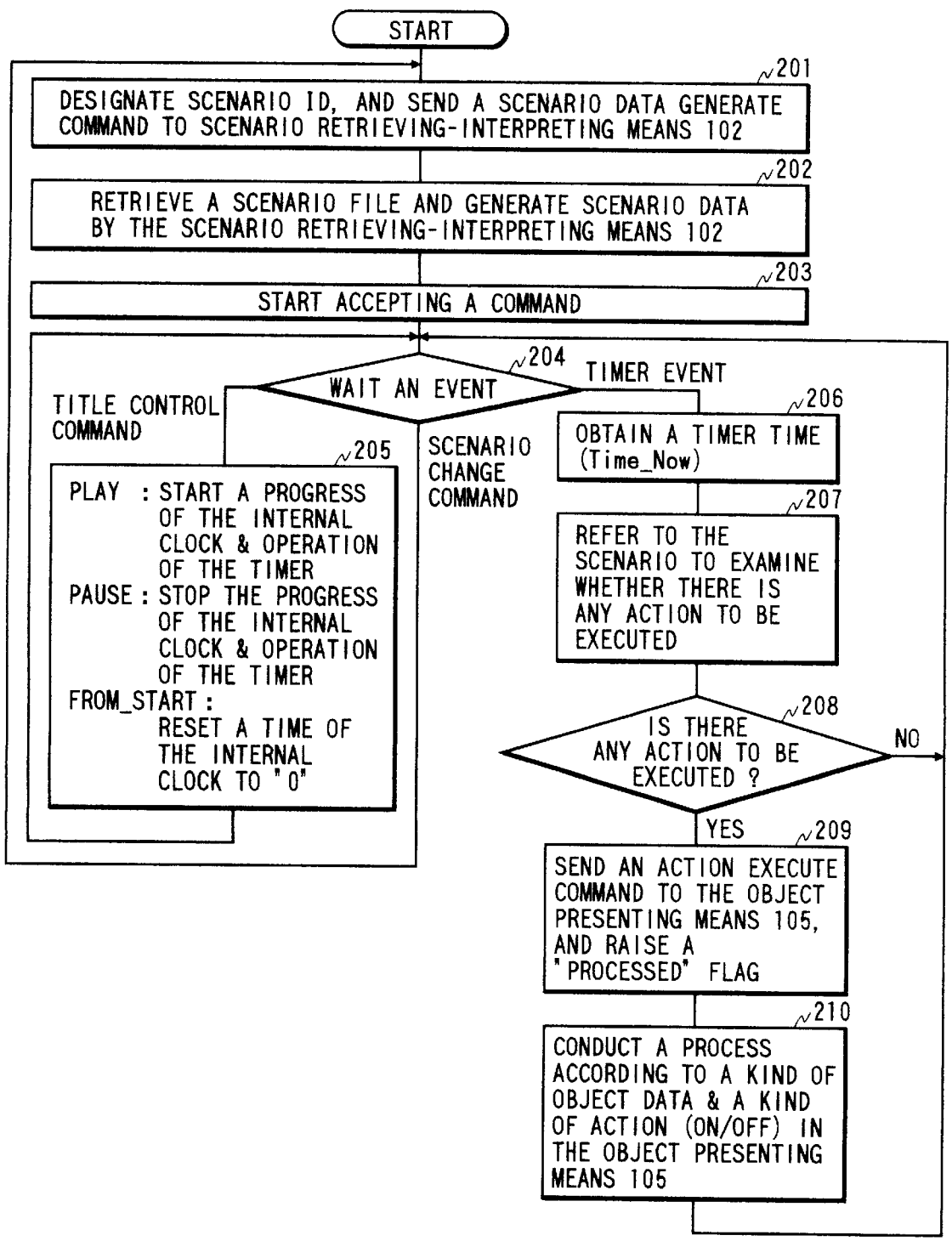
FIG. 2 is a flowchart showing an operation of the multi-media title playing apparatus according to a first embodiment.

FIG. 2 is a flowchart showing an operation of the multi-media title playing apparatus according to the first embodiment.

A flow of the process conducted in the multi-media title playing apparatus according to this embodiment will be next described with reference to FIGS. 1 and 2.

(1) First, the overall control managing means 104 designates a scenario ID and issues the scenario data generate command to the scenario retrieving-interpreting means 102 (Step 201 in FIG. 2).

(2) The scenario retrieving-interpreting means 102 retrieves a scenario file in the scenario and object data storage means 101 on the basis of the designated scenario ID, reads the retrieved scenario file, generates scenario data, and stores the generated scenario data in the scenario data storing means 103. When the above process is completed, the scenario retrieving-interpreting means 102 sends a data generation completion message to the overall control managing means 104 (Step 202 in FIG. 2).

(3) When receiving the data generation completion message from the scenario retrieving-interpreting mans 102, the overall control managing means 104 starts accepting a command from the title control command inputting means 106 or the external message interpreting means 108 (Step 203 in FIG. 2), and is in an event waiting state (Step 204 in FIG. 2).

(4) If receiving the title control command from the title control command inputting means 106 or the external message interpreting means 108, the overall control managing means 104 operates the internal clock to conduct the process as stated hereinbefore (Step 205 in FIG. 2).

(5) If receiving the timer event, the overall control managing means 104 obtains a current title time (Time_Now) from the internal clock (Step 206 in FIG. 2). The overall control managing means 104 then refers to the scenario data, and retrieves an unprocessed action whose time "Time" is listed after the current title time (Time_Now). A flag representing "processed" is used to know whether the action has been processed or is still unprocessed (Step 207 in FIG. 2). If there is any action falling into the above conditions, the overall control managing means 104 displays/outputs the object data using the object presenting means 105 so as to execute the action (Step 209 in FIG. 2). Details of this process is as in the above description of the detailed operation of the overall control managing means 104. A flag representing "processed" is raised at a processed action in the scenario data. If there is not any action falling in the above conditions, the overall control managing means does nothing.

(6) When receiving the action execute command from the overall control managing means 104, the object presenting means 105 conducts a process according to a kind of object data and a kind of an action (ON/OFF) (Step 210 in FIG. 2).

(7) If a message is sent to the multi-media title playing apparatus from the outside such as another application or the like using the DDE function, the external message receiving means 107 receives the message, the external message interpreting means 108 and converts the message into an internal command and hands the converted internal command to the overall control managing means 104.

(8) When receiving the scenario change command, the overall control managing means 104 designates a scenario ID and issues the scenario data generate command to the scenario retrieving-interpreting means 102 in the similar manner in the above process (1) (Step 201 in FIG. 2).

According to this embodiment, the multi-media title playing apparatus has a function to receive an external message, and convert the external message into an internal command, whereby the multi-media title playing apparatus is controllable from the outside.

If the multi-media title playing apparatus according to the embodiment is provided to each student in a class room at a school to give a lesson, for example, a teacher at his/her desk can temporarily stop a title of all the apparatus and change it to the next teaching title by operating a computer at hand. The multi-media title playing apparatus according to this embodiment is highly practical, as above.

(b) Description of a Second Embodiment

Figure 3:
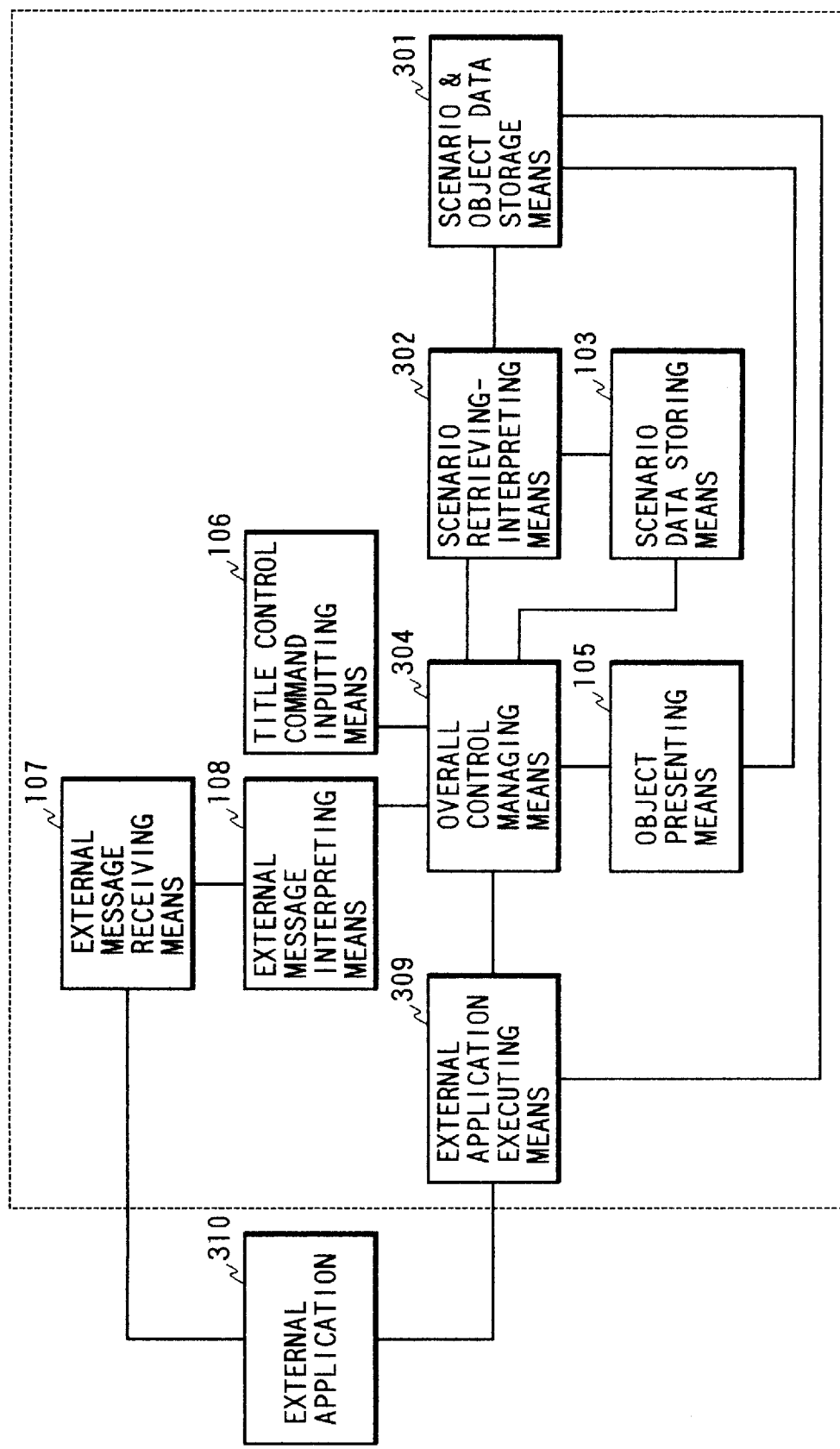
FIG. 3 is a block diagram showing a structure of a multi-media title playing apparatus using an external application according to a second embodiment of this invention.
Figure 4:
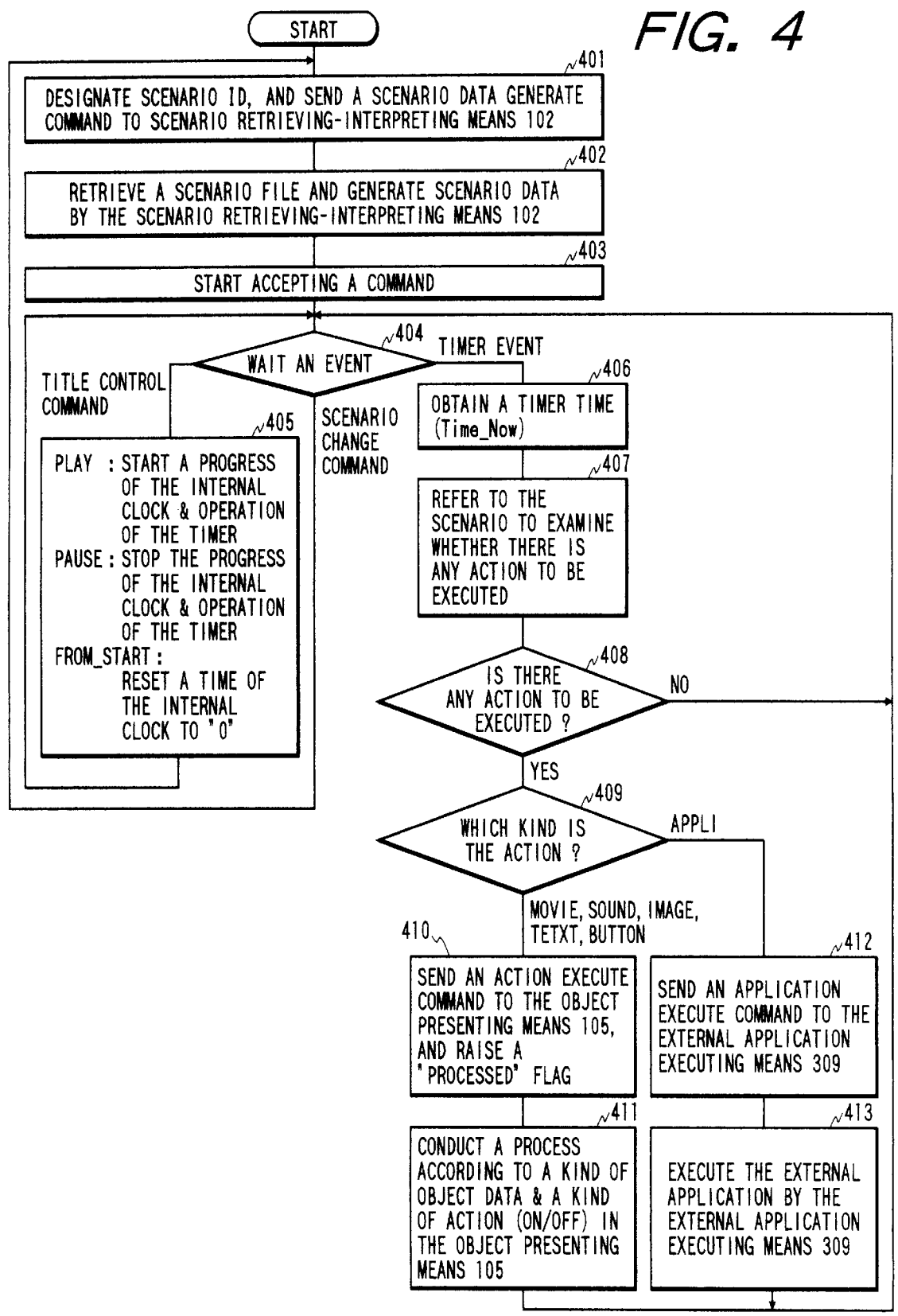
FIG. 4 is a flowchart showing an operation of the multi-media title playing apparatus according to the second embodiment.

Description will be next made of a second embodiment of this invention with reference to FIGS. 3 and 4. FIG. 3 is a block diagram showing a structure of a multi-media title playing apparatus according to the second embodiment. The structure of the multi-media title playing apparatus according to this embodiment is almost the same as the multi-media title playing apparatus according to the first embodiment shown in FIG. 1 excepting the following points.

In FIG. 3, reference numeral 301 denotes a scenario and object data storage means. The scenario and object data storage means 301 in FIG. 3 has a function to store a moving picture, a sound, a still picture, a text and an animated picture as object data similarly to the scenario and object data storage means 101 shown in FIG. 1. The scenario and object data storage means 301 additionally has a function to store an executable program as an external application.

Reference numeral 302 denotes a scenario retrieving-interpreting means whose format of scenario is different from that of the scenario retrieving-interpreting means 102 shown in FIG. 1. The scenario retrieving-interpreting means 302 handles a button (BUTTON) and an external application (APPLI) in addition to a moving picture (MOVIE), a sound (SOUND), a still picture (IMAGE) and a text (TEXT). A manner of describing the above two kinds of objects in [Object-Info] is as shown in Table 3 below.

| [Object-Info] | | |
|---|---|---|
| ObjectM, | BUTTON, | FilenameM |
| ObjectN, | APPLI, | FilenameN |

Here, "FilenameM" of object data of a button object in the first line is an execution file name which executes a linked application when the user clicks a button displayed/undisplayed at a timing described in a scenario. "FilenameN" of the object data of an external application object in the second line is an execution file name of an external application which executes the external application at a timing described in advance in the scenario, not by a click of the button by the user. [Action-Info] is similar to that described in the first embodiment. In the case of an external application object, kinds of action is only "execute" (ON) so that X, Y, Width, and Height are not described. The scenario retrieving-interpreting means 302 handles the format of a scenario different from that of the scenario retrieving-interpreting means 102 (shown in FIG. 1) described in the first embodiment, but has the same function to retrieve and interpret a scenario and convert it into scenario data.

Reference numeral 304 denotes an overall control managing means. Dissimilarly to the overall control managing means 104 shown in FIG. 1, the overall control managing means 304 interprets the above expanded scenario data, and makes an external application executing means 309, which will be described later, execute an external application if the action is to execute an external application object. Further, the overall control managing means 304 makes the object presenting means 105 display a button if the action is to display a button object. Still further, the overall control managing means 304 makes the external application executing means 309 execute a corresponding external application when the displayed button object is clicked. The overall control managing means 304 is different from the overall control managing means 104 (shown in FIG. 1) described in the first embodiment in the above points, but has the same function to control each means shown in FIG. 3 and control a progress of the whole title.

The external application executing means 309 receives an external application execute command from the overall control managing means 304, reads a corresponding program file from the scenario and object data storage means 301 which stores programs, and executes an external application. Conditions of the external application used in this invention is to make the user select or input something in the application, transmit a message obtained as a result of a conditional judgement on the selection or input by the user to the multi-media title playing apparatus to control the same. As a manner of transmitting a message to the multi-media title playing apparatus, a client function provided by DDE of Windows is used to transmit a message character string in LinkExecute event.

Next, description will be made of an operation of the multi-media title playing apparatus according to this embodiment. FIG. 4 is a flowchart showing the operation of the multi-media title playing apparatus according to this embodiment.

FIG. 4 is similar to FIG. 2, excepting that there is added a flow of the operation to process an execute action of an external application if the execute action of the external application is selected when the overall control managing means 304 executes an action shown by scenario data (at Step 209 and after in FIG. 2). Now, this part of the operation will be described, particularly.

(1) Steps 401 through 408 are similar to Steps 201 through 208 in FIG. 2.

(2) If there is any corresponding action, examine a kind of object data to be an object in [Object-Info] of scenario data (Step 409 in FIG. 4).

If a kind of the object data is a moving picture (MOVIE), a sound (SOUND), a still picture (IMAGE) or a text (TEXT), the process is as described in the first embodiment. If a kind of the object data is a button (BUTTON) and "action" is "display" (ON), the overall control managing means 304 displays a button in a designated position (X, Y) and in a designated size (Width, Height) on a display which is the object presenting means 105. If a kind of the action is "delete" (OFF), the overall control managing means 304 deletes a corresponding button. If a kind of the object data is "an external application" (APPLI), a kind of the action is only "execute" (ON). In which case, the overall control managing means 304 sends an external application execute command to the external application executing means 308 (Step 412 in FIG. 4). When receiving the external application execute command, the external application executing means 308 reads a corresponding program file from the scenario and object data storage means 301 in which programs are stored, and executes an external application (Step 413 in FIG. 4).

By providing a table used to convert an external message into an internal command shown in Table 4 below in addition to the structure shown in FIG. 3 and the scenario format shown in Table 3, an external control on an external application becomes possible.

TABLE 4

| External message | internal command |
|---|---|
| Scenario_change [ScenarioID] | PAUSE |
| | CHANGE [ScenarioID] |
| | FROM_START |
| Title_Pause | PAUSE |
| Title_Play | PLAY |
| Title_From_Start | FROM_START |
| Ctrl_Object ObjectN, ON | ObjectN, ON, XN, YN, WidthN, HeightN (when ObjectN is MOVIE, IMAGE, TEXT or BUTTON) |
| | Object N, ON (when ObjectN is SOUND or APPLI) |
| Ctrl_Object ObjectN, OFF | Object N, OFF | where
Object N is an object ID;
XN and YN are coordinates of a display; and WidthN, HeightN are a size of the display.

Table 4 is similar to Table 2 described in the first embodiment, excepting that two kinds of information, that is:

Ctrl_Object ObjectN, ON (an object display or play command); and

Ctrl_Object ObjectN, OFF (an object un-displaying or play terminate command) are added to the information of an object ID (ObjectN) and its operation (ON/OFF) which control the external message.

If the external message is Ctrl_Object ObjectN, OFF, they are converted into an internal command, ObjectN, OFF. If the external message is Ctrol_Object ObjectN, ON, [Action-Info] of the scenario is referred to and they are converted into an internal command:

ObjectN, ON, XN, YN, WidthN, HeightN
(in the case where ObjectN is a moving picture, a still picture, a text or a button), or
ObjectM, ON
(in the case where ObjectN is a sound or an external application),
where
XN and YN are displaying coordinates; and
WidthN and HeightN represent a displaying size.

The above process to receive an external message and convert it into an internal message is conducted by the external message interpreting means 108. Whether a message generated by the external application is sent again to the external message receiving means 107 or not is case by case. Therefore, an external message is not always sent to the external message receiving means 107. Namely, a connecting line between the external message receiving means 107 and the external application 310 is not always required in FIG. 3.

In the multi-media title playing apparatus according to this embodiment having a mechanism controllable from the outside, there is realized a function to describe an external application which has functions to make a conditional judgement according to a result of user's selection or input and transmit a message to the multi-media title playing apparatus in a scenario and executes it. It is thereby possible to dynamically control a title according to a result of user's selection or input without describing a complex conditional sentence or the like in a scenario, in other words, without necessity of a function to make a complex conditional judgement, in the multi-media title playing apparatus. Further, if it is desired to make another conditional judgement in a new mqde, it is possible to do it on the external application side. In consequence, it becomes unnecessary to additionally provide or expand a function to interpret the new conditional judgement of the multi-media title playing apparatus.

For example, it is possible to execute an external application which makes an examination on the student in an educational scenario, play the next scenario if the answer is correct, or play again the present educational title if the answer is incorrect. As this, the multi-media title playing apparatus according to this embodiment is highly practical.

(c) Description of a Third Embodiment

Figure 5:
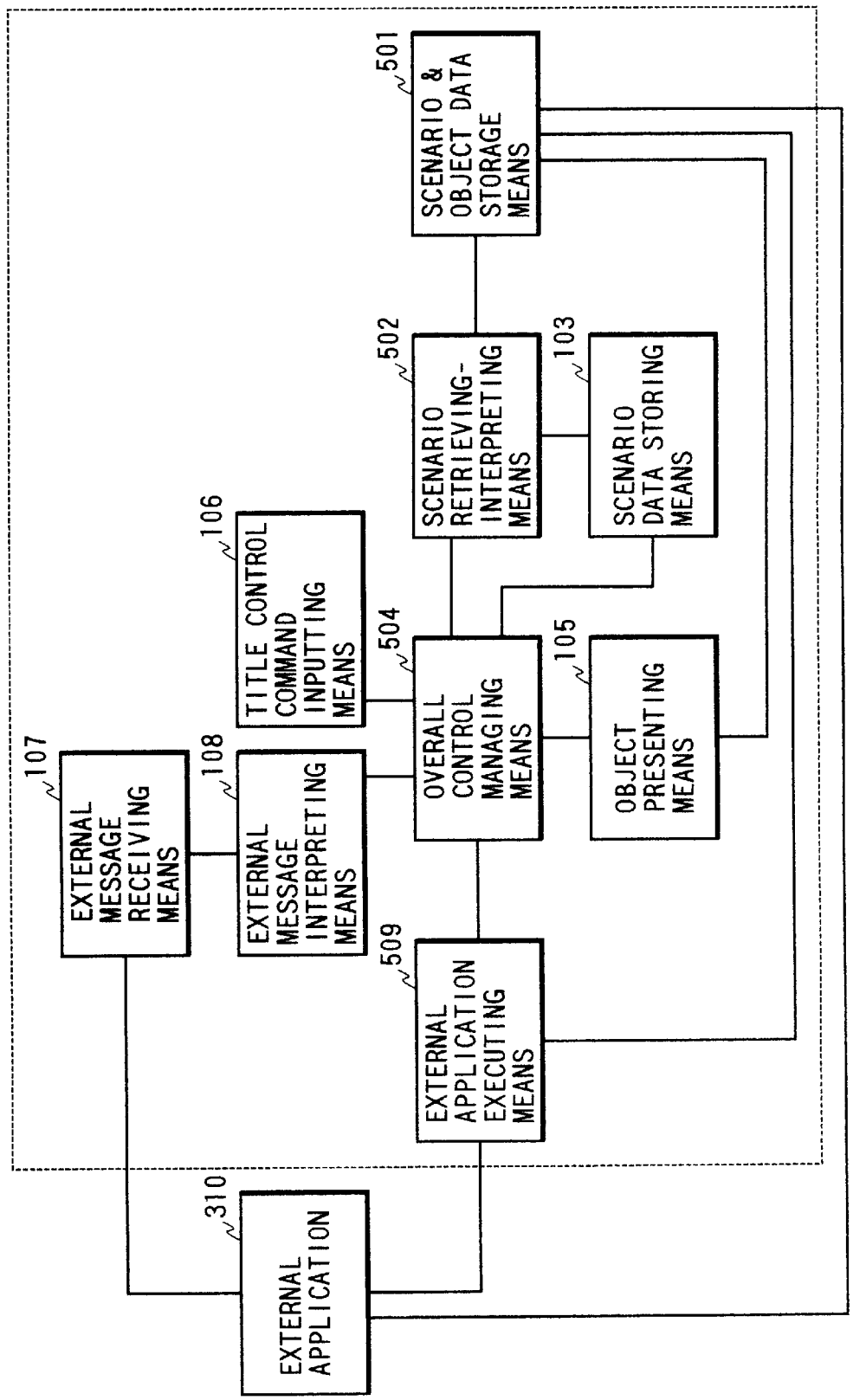
FIG. 5 is a block diagram showing a structure of a multi-media title playing apparatus using an external application according to a third embodiment of this invention.

Next, description will be made of a third embodiment of this invention. FIG. 5 is a block diagram showing a structure of a multi-media title playing apparatus according to the third embodiment, which is similar to the multi-media title playing apparatus shown in FIG. 3 according to the second embodiment, excepting the following points.

In FIG. 5, reference numeral 501 denotes a scenario and object data storage means. Differently from the scenario object storage means 301 shown in FIG. 3 according to the second embodiment, the scenario and object data storage means 501 shown in FIG. 5 has a function to store an operation file in which an operation of an external application is described, that is, a file in which environment setting and contents of an operation necessary when an external application is activated to be executed are described, as object data in addition to a moving picture, a sound, a still picture, a text and an animated picture program. As an example of the environment setting, there are a position, a size and the like of the application displayed on a display. As an example of the contents of the operation, there are a character string displayed in an application window, various operations of the application according to various inputs by the user, etc.

Reference numeral 502 denotes a scenario retrieving-interpreting means. The scenario retrieving-interpreting means 502 has a format of a scenario different from that of the scenario retrieving-interpreting means 302 shown in FIG. 3. A description of [Object-Info] of a button object and an external application object are shown in Table 5 below.

TABLE 5

| [Object-Info] | | | |
|---|---|---|---|
| OBJECT | OBJKIND | FILENAME | DOUSAFNAME |
| ObjectM, | BUTTON, | FilenameM, | DousaFnameM |
| ObjectN, | APPLI, | FilenameN, | DousaFnameN |

Here, DousaFnameM, DousaFnameN are operation files which describe operations of external applications of respective FilenameM and FilenameN conducted when these external applications are executed. The scenario retrieving-interpreting means 502 handles the format of a scenario different from those of the scenario retrieving-interpreting means 102 and 302 shown in FIGS. 1 and 3 according to the first and second embodiments as above, but has the same function to retrieve and interpret a scenario and convert it into scenario data.

Reference numeral 504 denotes an overall control managing means. Dissimilarly to the overall control managing means 304 shown in FIG. 3, the overall control managing means 504 has an additional function to designate an operation file described in a scenario when interpreting the above expanded scenario data and issuing an external application execute command to an external application executing means 509. The overall control managing means 504 is different from the overall control managing means 104 and 304 shown in FIGS. 1 and 3 according to the first and second embodiments in the above point, but has the same function to control each means shown in FIG. 5 and control a progress of the whole title.

The external application executing means 509 is different from the external application executing means 309 shown in FIG. 3 in a point that an operation file is designated when the external application executing means 509 receives the external application execute command from the overall control managing means 504, and the external application executing means 509 reads a corresponding program file and the designated operation file from the scenario and object data storage means 501 to execute the external application according to a description of the operation file. The external application executing means 509 is different from the external application executing means 309 shown in FIG. 3 according to the second embodiment in the above point, but has the same function to execute the external application 310 in response to activation of a program stored in the scenario and object data storage means 501.

Figure 6:
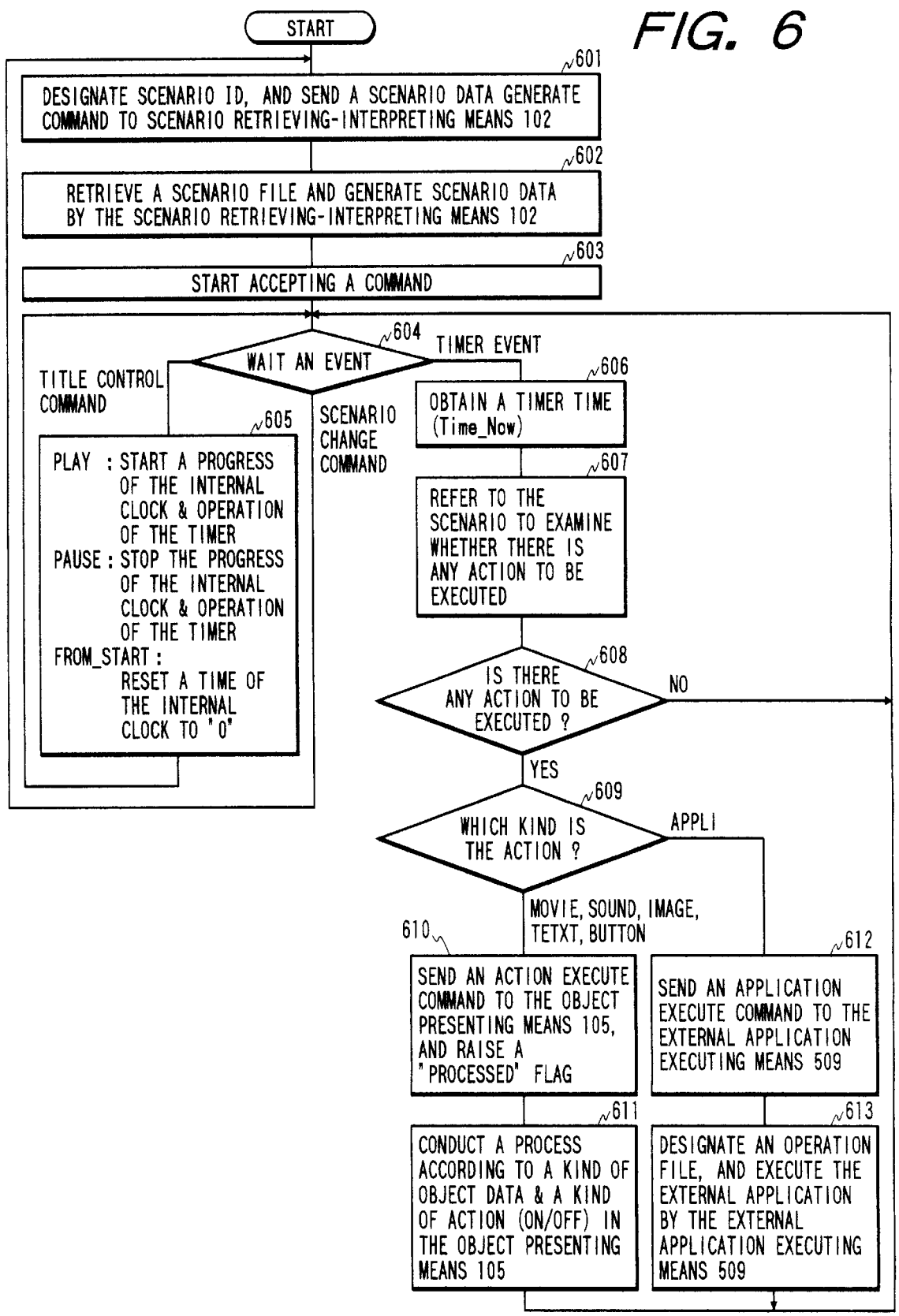
FIG. 6 is a flowchart showing an operation of the multi-media title playing apparatus according to a third embodiment.

Next, an operation of the multi-media title playing apparatus according to this embodiment will be described with reference to FIG. 6. FIG. 6 is a flowchart showing the operation of the multi-media title playing apparatus according to this embodiment.

FIG. 6 is similar to FIG. 4 described in the second embodiment excepting Steps 612 and 613. At Steps 612 and 613, conditions of an external application used in this embodiment are that the user selects or inputs something in the external application, then the external application makes a conditional judgement on a result of the user's selection or input, similarly to the operation shown in the flowchart shown in FIG. 4 according to the second embodiment. However, it is characterized in this embodiment that conditions used when the conditional judgement is made are described in a designated operation file dissimilarly to the operation shown in FIG. 4 according to the second embodiment. A message obtained as a result of the judgement is sent to the multi-media title playing apparatus to control the same similarly to the operation shown in FIG. 4.

FIGS. 7A and 7B, and 8A and 8B show concrete examples of such external application and operation file. FIG. 7A shows contents of a description of an operation file A. An external application operates as shown in FIG. 7B according to the contents of the description of the operation file A. When the same external application is executed according to an operation file B shown in FIG. 8A, the external application operates as shown in FIG. 8B. As this, one external application operates differently depending on an operation file combined thereto.

According to this embodiment, an external application which makes a conditional judgement is divided into an execution program which makes a conditional judgement and an operation file in which an operation is described. The execution program makes a conditional judgement by referring to the operation file and operates, and the execution program (the external application) and the operation file are corresponded to each other and described in a scenario. Whereby, it is possible to execute an external application which can differently operate in a title only by corresponding an operation file having different contents to the external application. If it is desired to execute an external application making a conditional judgement in the same mode but operating differently, it is possible to efficiently make a scenario including a lots of external applications operating in a similar manner only by making operation files without necessity of making new different applications.

If an educational scenario includes many examination applications in which a student selects one among plural answers, for example, it is unnecessary to make external applications in number equal to the number of questions. In which case, it is sufficient to make operation files for respective questions and describe an application and the operation file in combination in the scenario. This embodiment has been described by way of an example of the application in which the user selects one among plural answers and the application sends a message which is determined in advance (described in an operation file) to the multi-media title playing apparatus. However, it is alternatively possible to employ an external application (such as a Chinese character reading examination) in which the user inputs a character string and the application sends a message if the character string inputted by the user matches to a predetermined character string (described in an operation file), or sends another message if the character string inputted by the user does not match to the predetermined character string. As this, there is no limitation on a mode of an application according to this embodiment so that this embodiment is highly practical.

In the above embodiments, there is no description of a scenario of an animated picture. However, it is possible to add items as to an animated picture to a scenario employed in each embodiment so as to provide the same function and effect as well as a moving picture, a sound, a still picture, a text, an external application and an operation file.

What is claimed is:

1. A multi-media title playing apparatus comprising:

a scenario and object data storage means for storing object data of a moving picture, a sound, a still picture, a text and an animated picture and a scenario in which a manner of representing said object data is described;

a scenario retrieving-interpreting means for retrieving said scenario from said scenario and object data storage means and interpreting said scenario into scenario data;

a scenario data storing means for storing said converted scenario data;

a title control command inputting means for accepting a command used to operate a title composed of said scenario and said object data;

an object presenting means for displaying and outputting an object which is a unit of said title when said title is displayed and outputted according to said scenario data stored in said scenario data storing means;

an external message receiving means for receiving a message generated from the outside of said multi-media title playing apparatus;

an external message interpreting means for interpreting said received message; and an overall control managing means for controlling said scenario and object data storage means, said scenario retrieving-interpreting means, said scenario data storing means, said title control command inputting means, said object presenting means, said external message receiving means and said external message interpreting means;

said external message interpreting means converting said message received by said external message receiving means into an internal command interpretable by said overall control managing means, whereby said overall control managing means controls play of said title according to said converted internal command.

2. A multi-media title playing apparatus according to claim 1, wherein said scenario and object data storage means also stores a program executable as an external application as said object data, said multi-media title playing apparatus further comprises an external application executing means for executing said external application in response to activation of said program, and said external message receiving means receives an instruction to activate said program.

3. A multi-media title playing apparatus according to claim 1, wherein said scenario and object data storage means also stores a program executable as an external application as said object data, said multi-media title playing apparatus further comprises an external application executing means for executing said external application in response to activation of said program, and said external message receiving means receives a message generated by said external application executed by said external application executing means.

4. A multi-media title playing apparatus according to claim 2, wherein said scenario and object data storage means also stores an operation file in which an operation of said external application is described as said object data, and said external application executing means executes said external application according to a description of said designated operation file.

* * * * *